(12) United States Patent
Gade et al.

(10) Patent No.: US 12,113,693 B2
(45) Date of Patent: Oct. 8, 2024

(54) COMMUNICATION IN AN INDUSTRIAL AUTOMATION SYSTEM

(71) Applicant: ABB SCHWEIZ AG, Baden (CH)

(72) Inventors: Jörgen Gade, Västerås (SE); Maryam Vahabi, Västerås (SE); Xiaolin Jiang, Linköping (SE); Johan Åkerberg, Västerås (SE); Pietro Falco, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/052,837

(22) Filed: Nov. 4, 2022

(65) Prior Publication Data

US 2023/0144148 A1    May 11, 2023

(30) Foreign Application Priority Data

Nov. 11, 2021    (EP) .................................... 21207761

(51) Int. Cl.
*H04L 43/0882*    (2022.01)
*H04L 43/08*    (2022.01)
(Continued)

(52) U.S. Cl.
CPC .......... *H04L 43/0882* (2013.01); *H04L 43/08* (2013.01); *H04L 43/0829* (2013.01); *H04L 43/0852* (2013.01); *H04L 43/087* (2013.01)

(58) Field of Classification Search
CPC ............. H04L 43/0852; H04L 43/0829; H04L 43/087; H04L 43/0882; H04L 43/08
See application file for complete search history.

(56) References Cited

U.S. PATENT DOCUMENTS 11,265,834 B2 * 3/2022 Wei .................... H04W 56/0015
2019/0379591 A1 * 12/2019 Boughzala .......... H04L 43/0852
(Continued)

FOREIGN PATENT DOCUMENTS

WO    2020125396 A1    6/2020

OTHER PUBLICATIONS

Belliardi, Rudy, et al.; "Use Cases IEC/IEEE 60802 V1.3"; vol. 802.1, No. v01; IEEE Draft; Piscataway, NJ, USA; Nov. 12, 2018; 74 Pages.

(Continued)

*Primary Examiner* — Nam T Tran
(74) *Attorney, Agent, or Firm* — Whitmyer IP Group LLC (57) ABSTRACT

A method, arrangement, computer program and computer program product for improving communication between devices of an industrial automation system running automation applications as well as to such an industrial automation system. The devices include a first and a second endpoint device of a communication path for a data stream through a time sensitive network and for which a corresponding application has an application cycle time at which the first and second endpoint device are to transmit data to each other. The first endpoint device detects a communication degradation of the data stream, which communication degradation is indicative of congestion and performs a congestion limiting activity from a group of congestion limiting activities, which group at least includes an activity of increasing the application cycle time of the data stream.

19 Claims, 5 Drawing Sheets

(51) Int. Cl.
*H04L 43/0829* (2022.01)
*H04L 43/0852* (2022.01)
*H04L 43/087* (2022.01)

(56) References Cited

U.S. PATENT DOCUMENTS

| | | | |
|---|---|---|---|
| 2020/0259896 A1 | 8/2020 | Salmela et al. | |
| 2020/0412813 A1* | 12/2020 | Mong | H04L 43/0852 |
| 2021/0211368 A1* | 7/2021 | Zheng | H04L 43/0882 |
| 2022/0150153 A1* | 5/2022 | Clancy | H04L 43/0852 |

OTHER PUBLICATIONS

Nasrallah, Ahmed, et al.; "Reconfiguration Algorithms for High Precision Communications in Time Sensitive Networks: Time-Aware Shaper Configuration with IEEE 802. 1Qcc (Extended Version)"; Cornell University Library, 201, Olin Library Cornell University, Ithaca, NY, 14853; Jun. 27, 2019; 29 Pages.
Extended European Search Report; Application No. 21207761.4; Completed: Apr. 20, 2022; Issued: May 2, 2022; 17 Pages.

\* cited by examiner

COMMUNICATION IN AN INDUSTRIAL AUTOMATION SYSTEM

TECHNICAL FIELD

The present invention relates to a method, arrangement, computer program and computer program product for improving communication between devices of an industrial automation system as well as to such an industrial automation system.

BACKGROUND

One of the core technologies that makes the vision of informational technology/operational technology (IT/OT) convergence to come true is Time Sensitive Networking (TSN). TSN is for instance described in US 2020/0259896.

TSN promised to guarantee the timing requirements of time sensitive flows while still enabling the coexistence of different traffic types in the same network.

A TSN network may be used for an industrial automation system, where different applications that have different timing requirements are being employed, which applications may additionally be process control applications.

However, such a TSN network may become congested. It would in this case be of interest to perform activities that limit network congestion, especially with regard to the individual requirements of a specific application.

It is therefore of interest to address congestion in a TSN network.

SUMMARY

Aspects of the present invention are directed towards improving communication in an industrial automation system.

This object is according to a first aspect archived through a method for improving communication between devices of an industrial automation system running automation applications, which devices comprise a first and a second endpoint device in of a communication path for a data stream through a time sensitive network and for which data stream a corresponding application has an application cycle time at which the first and second endpoint device are to transmit data to each other, the method comprising performing by the first endpoint device:
 detecting a communication degradation of the data stream, which communication degradation is indicative of congestion in the data communication network, and
 performing a congestion limiting activity from a group of congestion limiting activities, which group at least comprises an activity of increasing the application cycle time of the data stream.

The object is according to a second aspect archived through an arrangement for improving communication between devices of an industrial automation system running automation applications, which devices comprise a first and a second endpoint device of a communication path for a data stream through a time sensitive network and for which data stream a corresponding application has an application cycle time at which the first and second endpoint device are to transmit data to each other, the arrangement comprising the first endpoint device having a processor acting on computer instructions, whereby the first end point device is operative to:
 detect a communication degradation of the data stream, which communication degradation is indicative of congestion in the data communication network, and
 perform a congestion limiting activity from a group of congestion limiting activities, which group at least comprises an activity of increasing the application cycle time of the data stream.

The object is according to a third aspect achieved through an industrial automation system comprising a time sensitive network, devices running automation applications and an arrangement according to the second aspect.

The object is according to a fourth aspect achieved through a computer program for improving communication between devices of an industrial automation system running automation applications, which devices comprise a first and a second endpoint device of a communication path for a data stream through a time sensitive network and for which data stream a corresponding application has an application cycle time at which the first and second endpoint device are to transmit data to each other, the computer program comprising computer program code which when run by a processor of the first endpoint device causes the first endpoint device to:
 detect a communication degradation of the data stream, which communication degradation is indicative of congestion in the data communication network, and
 perform a congestion limiting activity from a group of congestion limiting activities, which group at least comprises an activity of increasing the application cycle time of the data stream.

The object is according to a fifth aspect achieved through a computer program product for improving communication of an industrial automation system running automation applications, the computer program product comprising a storage medium with computer program code according to the fourth aspect.

The first endpoint device may comprise a transmit buffer for transmission of data over the communication path.

The group of activities may comprise an activity of adjusting an offset to a network clock of the time sensitive network, an activity of changing the priority of transmissions over the communication path, an activity of setting at least some packets intended to be transmitted over the communication path to be droppable, an activity of setting up an alternative communication path through the time sensitive network and/or and activity of throttling transmissions from the transmit buffer.

There may be more than one data stream in the communication path having different priorities.

In this case the increasing of the application cycle time may first be made for a low priority data stream. It is furthermore possible that the increasing of the application cycle time is made in an order of priority starting from the data stream with the lowest priority. It is additionally possible that the increasing of the application cycle according to the order of priority is stopped if the communication degradation ceases.

The first endpoint device may additionally comprise a receive buffer and the detecting of the communication degradation may be performed through investigating the receive buffer.

The communication degradation may additionally be of a certain type, where a first type may be jitter, a second type may be latency and a third type may be dropped packets.

For the case of jitter, the investigating of the receive buffer may comprise investigating if the periodicity of packets in the receive buffer deviate from a nominal periodicity. For the case of latency, the investigating of the receive buffer may involve comparing time stamps of packets received in the receive buffer with the time of reception. For the case of dropped packets, the investigating of the receive buffer may involve investigating if one or more packets in a sequence of packets are absent in the receive buffer.

The detecting of a communication degradation may additionally involve comparing the communication degradation with a threshold and considering the communication degradation as detected if the threshold is crossed. Jitter may be compared with a jitter threshold, latency with a latency threshold and a number of dropped packets with a dropped packet threshold.

The first endpoint device may additionally have a mapping between communication degradation type and congestion limiting activity.

In this case the congestion limiting activity may be made according to the mapping. This may involve selecting and performing at least one congestion limiting activity according to the mapping.

The mapping may additionally be a mapping of a combination of congestion limiting activities to a communication degradation type. Each activity combination may include at least one activity and at least one of the activity combinations may comprise increasing application cycle time. The different activity combinations may also differ from each other.

There may be a first activity combination mapped to the first type of communication degradation, a second activity combination mapped to the second type of communication degradation and a third activity combination mapped to the third type of communication degradation.

The method may additionally comprise reporting the communication degradation to an activity mapping device. The method may additionally comprise receiving a changed mapping from the activity mapping device.

The first endpoint device may therefore also be operative to report the communication degradation to an activity mapping device as well as operative to receive a changed mapping from the activity mapping device.

The arrangement may additionally comprise the second endpoint device.

The second endpoint device may have the same realization and the same type of operation as the first endpoint device.

The second endpoint device may thereby have a processor acting on computer instructions, whereby the second endpoint device is operative to detect a communication degradation of a data stream and perform a congestion limiting activity from a group of congestion limiting activities. In this case the second endpoint device uses the same group of congestion limiting activities. If there is a mapping, it may also be the same mapping in the second endpoint device as in the first endpoint device.

The second endpoint device may therefore have a receive buffer that is investigated and a transmit buffer in relation to which at least some of the activities are performed.

The method may therefore also comprise performing, by the second end point device, detecting a communication degradation of a data stream and performing a congestion limiting activity from a group of congestion limiting activities.

It is also possible that the activity mapping device is a part of the arrangement.

The activity mapping device may be realized as a processor acting on computer instructions, whereby the activity mapping device is operative to receive communication degradation reports about communication degradation from endpoint devices of communication paths for data streams, which reports include a report from the first endpoint device and possibly also from the second endpoint device, investigate, for the data stream between the first and the second endpoint device, the result of at least one currently mapped activity on a reported communication degradation and change the mapping for this data stream based on the investigation.

In this case it is likewise possible that the method comprises, in the activity mapping device, receiving communication degradation reports about communication degradation from endpoint devices of communication paths for data streams, investigating, for the data stream between the first and the second endpoint device, the result of at least one currently mapped activity on a reported communication degradation and changing the mapping for this data stream based on the investigation.

The invention has a number of advantages. The network congestion as experienced by the application is reduced. The congestion is thus handled on an application level. Thereby the availability of the specific application of the data stream is also improved. This may be important because different applications may have different degrees of sensitivity to different types of communication degradation. Thereby, the specific situation of the application is considered in performing the congestion limiting activity.

BRIEF DESCRIPTION OF THE DRAWINGS

The present invention will in the following be described with reference being made to the accompanying drawings, where:

FIG. 1 schematically shows a first type of industrial automation system suitable for being combined with a time sensitive network (TSN), FIG. 2 schematically shows a second type of industrial automation system suitable for being combined with a TSN network, FIG. 3 schematically shows a number of nodes in a TSN network, where a first communication path for a first TSN stream is set up between a first and a second endpoint device, FIG. 4 schematically shows a number of endpoint devices communicating with an activity mapping device, FIG. 5 schematically shows one realization of the first endpoint device, FIG. 6 schematically shows one realization of the activity mapping device, FIG. 7 schematically shows a number of method steps in a method of improving communication, which method steps are being performed by the first endpoint device, FIG. 8 schematically shows a number of application cycles that can be used by the first endpoint device for improving communication, FIG. 9 schematically shows a number of method steps being performed in the activity mapping device in order to change the way in which endpoint devices operate for improving communication, FIG. 10 schematically shows a computer program product in the form of a CD Rom disc comprising said computer program code for realizing the first endpoint device, and FIG. 11 schematically shows a computer program product in the form of a CD Rom disc comprising computer program code for realizing the activity mapping device.

DETAILED DESCRIPTION

In the following, a detailed description of preferred embodiments of a method and a congestion handling arrangement for improving communication will be given, where the congestion handling arrangement may comprise a first endpoint device as well as possibly a second endpoint device and/or an activity mapping device.

Figure 1:
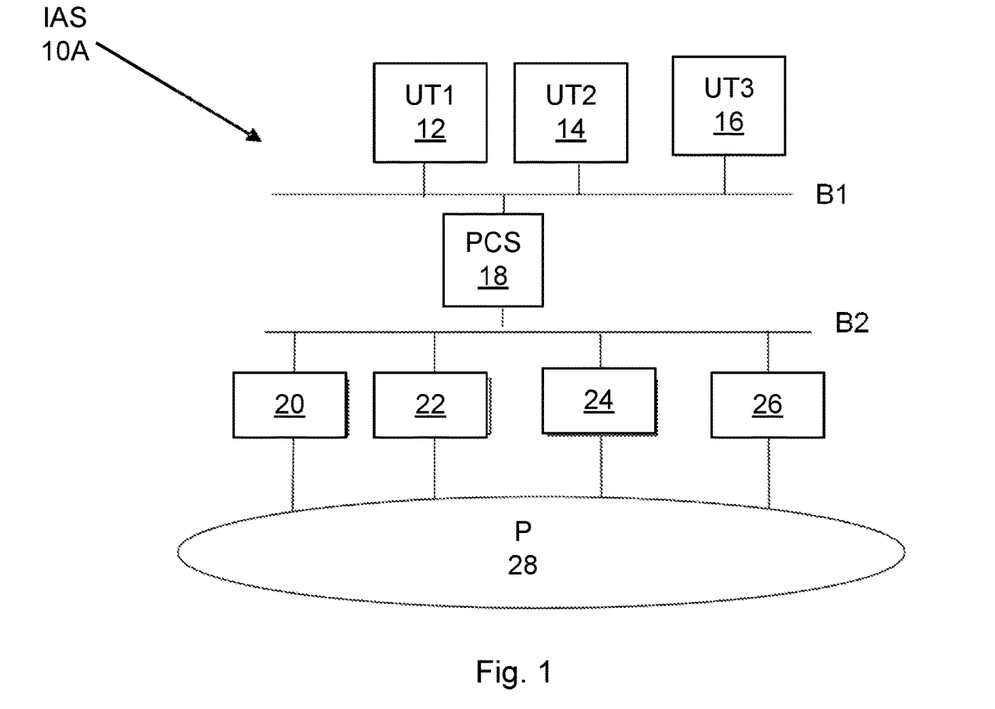

FIG. 1 schematically shows a first type of industrial automation system IAS 10A, in which a time sensitive network (TSN) may be used for communicating between nodes of the system. The industrial automation system 10A may be a process control system, which process control system may be provided in an industrial plant. The process control system 10A implements computerized process control for controlling an industrial process P 28. Examples of industrial processes that may be controlled are electrical power generation, transmission and distribution processes, water purification and distribution processes, oil and gas production and distribution processes, petrochemical, chemical, pharmaceutical and food processes, and pulp and paper production processes. These are just some examples of processes where the system can be applied. There exist countless other industrial processes. The processes may also be other types of industrial processes such as the manufacturing of goods. A process may be monitored through one or more process monitoring computers, which communicate with a computer or server handling monitoring and control of the process.

In FIG. 1, the process control system 10A therefore includes a number of user terminals UT1 12, UT2 14 and UT3 16. The user terminals may be process monitoring computers. These computers may here also be considered to form operator terminals and/or engineering terminals and are connected to a first data bus B1. There is furthermore a second data bus B2 and between the first and second data busses B1 and B2 there is connected a first control computer 18 that is a process control server.

To the second data bus B2 there is also connected a number of further devices 20, 22, 24 and 26. These further devices 20, 22, 24 and 26 are field devices, which are process interface devices that are interfaces to the process P 28 being controlled. There is in this case a first, second, third and fourth field device 20, 22, 24 and 26. A field device is typically an interface via which measurements of the process are being made and to which control commands are given. The measurements may be measurements of physical properties related to the process P 28. A field device may as an example be a tank and another as an example a centrifuge. The process control server 18 may be involved in controlling the process P 28 based on inputs from field devices, such as from sensors of field devices, and actuating the same or other field devices, such as valves, based on the inputs. The field devices and computers are all examples of process control devices that are also real-world objects involved in the control of the process P.

The field devices 20, 22, 24 and 26 and the process control server 18 are examples of devices that can form nodes of a TSN network. Routers and switches between these devices may also form nodes of the TSN network.

Figure 2:
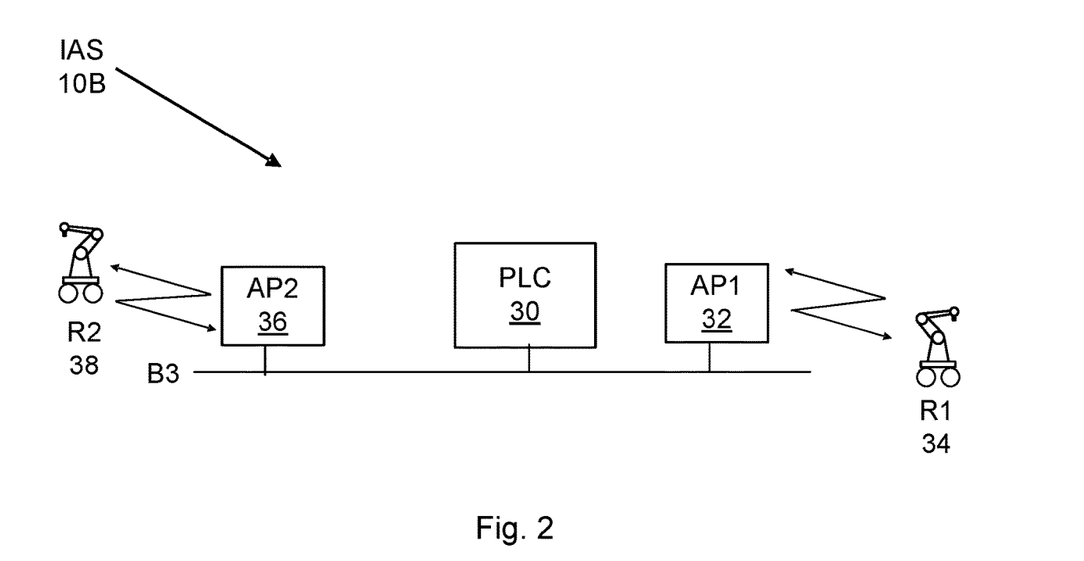

FIG. 2 shows another type of industrial automation system IAS 10B. In this case there are a number of mobile industrial robots. There is here a first industrial robot R1 34 communicating wirelessly with a first wireless access point AP1 32 and a second industrial robot R2 38 communicating wirelessly with a second access point AP2 36. The two access points 32 and 36 as well as a programmable logic controller PLC 30 are furthermore connected to a third bus B3 for allowing communication between each other. Also, the second type of industrial automation system 10B may with advantage employ TSN. The PLC 30, the access points 32 and 36 and the industrial robots 34 and 38 are examples of devices that can form nodes of a TSN network.

Both these systems are industrial automation system running automation applications, which applications may as an example be run by the process control server or the PLC.

Figure 3:
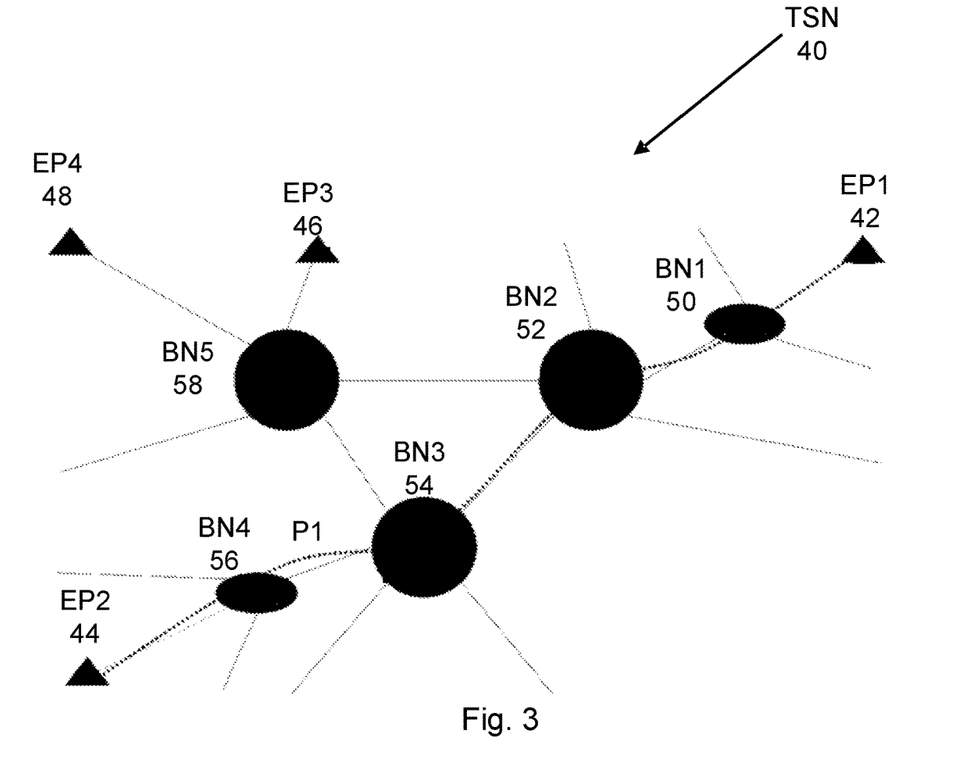

FIG. 3 shows an example of a number of nodes in a TSN network 40, where some nodes are end points of TSN streams. Thereby these nodes are endpoint devices forming end points of TSN streams. There is here a first endpoint device EP1 42, a second endpoint device EP2 44, a third endpoint device EP3 46 and a fourth endpoint device EP4 48. The TSN network also comprises as first bridge node BN1 50, a second bridge node BN2 52, a third bridge node BN3 54, a fourth bridge node BN4 56 and a fifth bridge node BN5 58, where the bridge nodes are employed for interconnecting the various endpoint devices. The first bridge node 50 is connected to the first endpoint device 42 as well as to the second bridge node 52, while the second bridge node 52 is connected to the fifth bridge node 58 as well as to the third bridge node 54. The third bridge node 54 is in turn connected to the fourth bridge node 56 as well as to the fifth bridge node 58. The second endpoint device 44 is connected to the fourth bridge node 56, while the fourth and the fifth endpoint device 46 and 48 are connected to the fifth bridge node 58.

It should here also be realised that the TSN network 40 may be a mixed wireless and wired network. The first and the fourth bridge nodes 50 and 56 may as an example be realised as wireless access points, such as wireless routers, while the second, third and fifth bridge nodes 52, 54 and 58 may be realized as wired bridge nodes, such as wired routers or switches. It should also be realized that the network configuration shown in FIG. 3 is merely an example. It is possible with more as well as fewer nodes. It is likewise possible that the network is only wireless or only wired. As can be understood from FIGS. 1 and 2 the endpoint devices may be either stationary or mobile. It can also be understood that the process control server 18 and field devices 20, 22, 24, and 26 of FIG. 1 and the PLC 30 and the industrial robots 34 and 38 of FIG. 2 are examples of endpoint devices, while the access points 32 and 36 of FIG. 2 are examples of bridge nodes.

Furthermore, all the nodes may be equipped with buffers for transmission and reception of data.

In the example in FIG. 3, the first endpoint device 42 is a first endpoint of a first communication path P1 of a first data stream, here also denoted a first TSN stream, and the second endpoint device 44 is a second end point in the first communication path P1 of the first TSN stream. In the example given here, the first, second third and fourth bridge nodes 50, 52, 54 and 56 are all connected in the first communication path P1 between the first and the second endpoint devices 42 and 44. The third and the fourth endpoint devices 46 and 48 are in turn end points of other TSN streams. The first TSN stream is a data stream for an application in the automation system and this application has an application cycle time at which the first and second endpoint device are to transmit data to each other.

Figure 4:
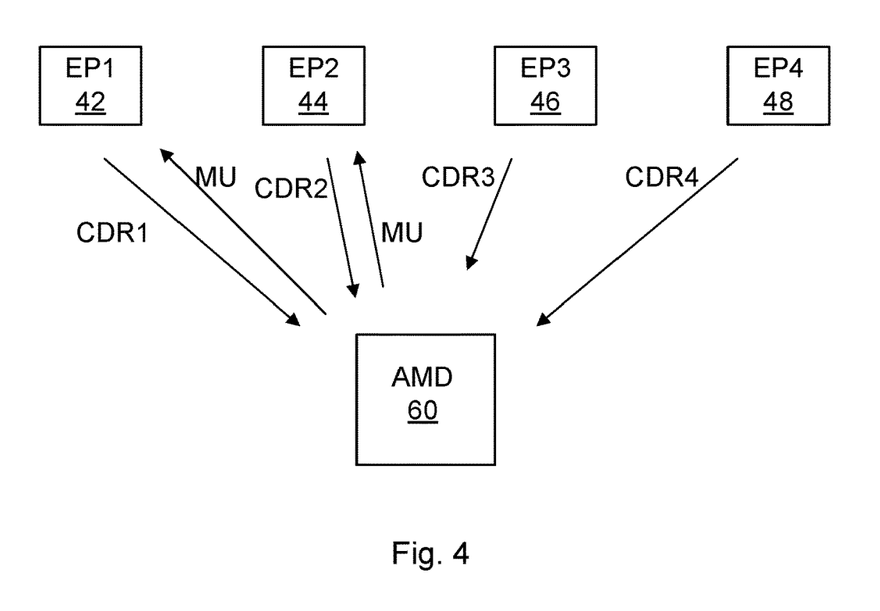

FIG. 4 schematically shows the endpoint devices communicating with an activity mapping device AMD 60. The first endpoint device 42 is shown as sending a first communication degradation report CDR1 to the activity mapping device 60, the second endpoint device 44 is shown as sending a second communication degradation report CDR2 to the activity mapping device 60, the third endpoint device 46 is shown as sending a third communication degradation report CDR3 to the activity mapping device 60 and the fourth endpoint device 48 is shown as sending a fourth communication degradation report CDR1 to the activity mapping device 60. The activity mapping device 60 is in turn shown as sending a mapping update MU to the first and the second endpoint devices 42 and 44. The communication degradation reports CDR1, CDR2, CDR3 and CDR4 and the mapping updates MU will be described in more detail later.

Figure 5:
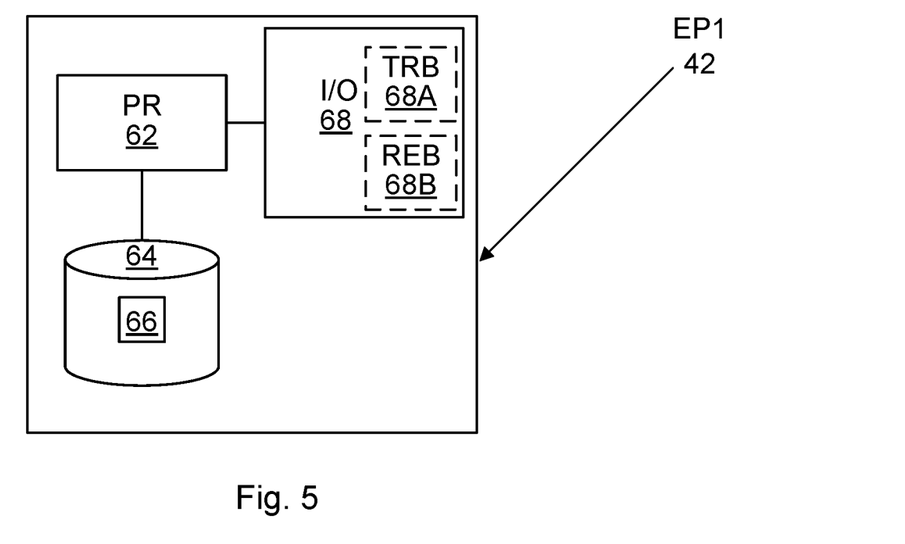

FIG. 5 shows one realization of the first endpoint device 42. It comprises a processor PR 62 and a data storage 64 with computer program instructions 66 that, when executed by the processor 62, implements a congestion limiting function. There is also an input/output (I/O) interface 68 for communication with bridge nodes and the activity mapping device. As can also be seen the I/O interface 68 comprises a transmit buffer TRB 68A for transmitting data to the TSN network 40 and a receive buffer REB 68B for receiving data from the TSN network 40. The transmit buffer 68A is more particularly provided for transmission of data over the previously mentioned first communication path and the receive buffer 68B is provided for reception of data from the first communication path.

The I/O interface 68 may additionally comprise a radio circuit and antenna for communicating with the first bridge node 50, in case the first bridge node is a wireless access point (not shown).

It should be realized that the second endpoint device may also have the above-described realization. The second endpoint device may thus have the same realization as the first endpoint device.

Figure 6:
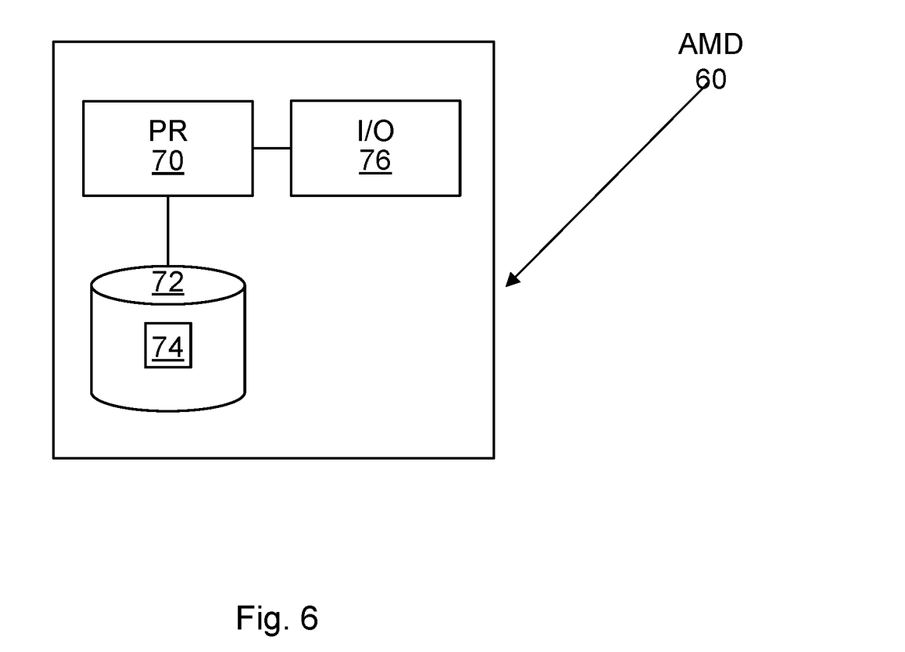

FIG. 6 schematically shows one realization of the activity mapping device 60. There is a processor PR 70 and a data storage 72 with computer program instructions 74 that, when executed by the processor 70, performs an activity mapping function. There is also an input/output (I/O) interface 76 for communication with the endpoint devices.

Figure 7:
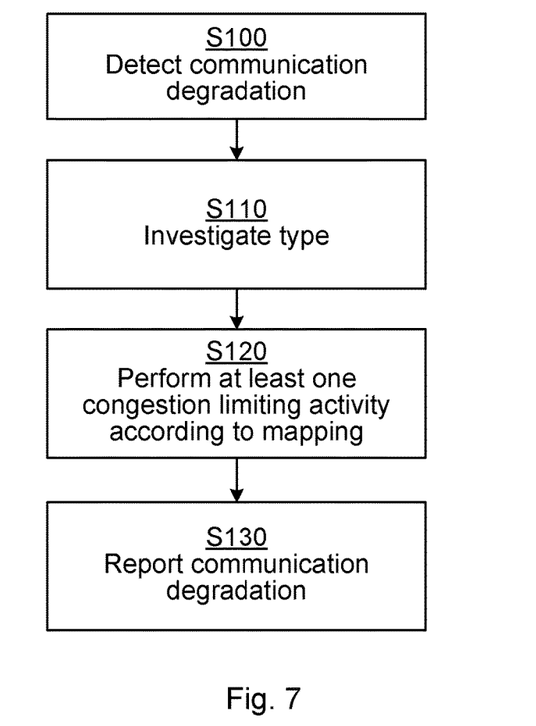
Figure 8:
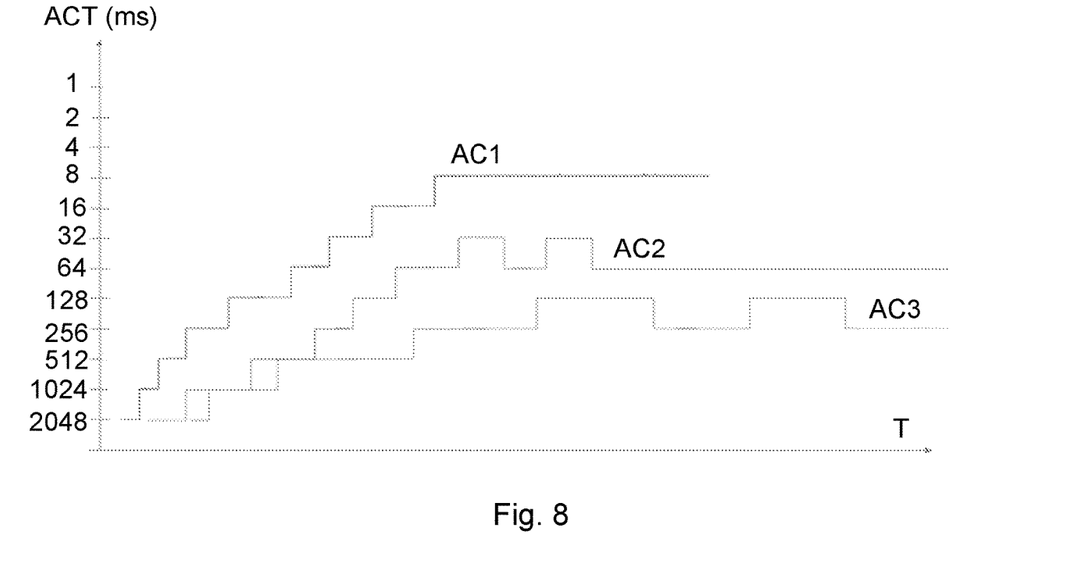

Now a first embodiment will be described with reference also being made to FIGS. 7 and 8, where FIG. 7 shows a number of method steps in a method of improving communication, which method steps are being performed by the first endpoint device forming a first end point in the first communication path P1 of the first TSN stream, and FIG. 8 schematically shows a number of application cycles that can be used by the first endpoint device 42.

In the TSN network 40 endpoint devices are communicating with each other in different communication paths for different TSN streams, where such a communication path is used for communicating in an automation application involving at least two endpoint devices, where as an example the first and second endpoint device 42 and 44 are endpoint devices involved in communication for an automation application. The application may be a process control application like a distributed process control system (DCS) application, i.e. an application used to control an industrial process. It may additionally or instead be an application involving the use of an industrial robot. Communication of this automation application may have a certain priority according to a service level agreement (SLA). Data being transmitted in a stream may then be transmitted using a certain application cycle time corresponding to the level of priority according to the SLA. An application cycle time is then the time at which the application expects transmission of data in a stream to be repeated. The application cycle time may thereby define the periodicity of the transmissions of a stream between the endpoint devices. It may more particularly be the time between consecutive transmitted packets of the stream. The application cycle time may additionally need to meet a timing requirement of the application. If the application is a process control application the application cycle time may need to be low enough for allowing control to be performed. It may as an example need to be low enough for the application to react in time on a measured property of the process.

In FIG. 8, there is shown a first application cycle AC1 for a first TSN stream with high priority, where the application cycle time (ACT) may be 8 ms, a second application cycle AC2 for a second TSN stream with medium priority, where the application cycle time may be 64 ms, as well as a third application cycle AC3 for a third TSN stream with a low priority, where the application cycle time may be 256 ms. It can be seen that it is possible that the lower the application cycle time is, the higher the priority is. However, it should be realized that this is not necessarily so. Slower cycle times can be used also for higher priority applications.

It is possible that the data in the first communication path P1 of the first TSN stream is initially transmitted with a certain application cycle time, between the first and the second end points, for instance the application cycle time 8 ms of the first application cycle AC1. Now, if there is a lot of traffic in the TSN network, then there may be congestion, for instance if data in several communication paths pass by the same bridge node.

Aspects of the present disclosure address this problem. How this may be done in the first endpoint device 42 will now be described.

The first and second endpoint devices are operational technology (OT) endpoints involved in Time Sensitive Communication (TSC) in the TSN network 40. The SLA for the communication path between two such end points may define quality requirements, such as:
  less than a certain maximum latency/jitter for the TSN stream, and
  a maximum number of consecutively dropped packets for the TSN stream.

According to aspects of the present disclosure, applications, like DCS applications, are "extended" with a number of activities including Application Cycle Adaption (ACA) to adapt "OT endpoint" behavior when network fails providing preferred SLAs. ACA constitutes one more feature to manage, for instance, in converged IT/OT networks to increase Application Functionality Availability (AFA) and to enable simplified Network Configuration (NC).

ACA and NC can constantly improve AFA when a TSN network for one reason or another is not able to provide the preferred SLA. ACA is extra valuable in TSN networks with mobile "OT endpoints", such as Automated Guided Vehicles (AGV). Imagine a large number of AGVs simultaneously ending up in geographically unfavorable communication positions with weak signal condition and very few Access Points (AP) to handle huge, combined bandwidth/latency/reliability requirements. This critical situation calls for action.

Another example is related to mobile robots. Assume that woo mobile robots (e.g., AGVs and Ind. Robots) are moving in a large factory. Wireless communication from "a distributed cloud" controls their movements. Depending on the location of robots, one or more APs might be overloaded with TSC and probably experience unacceptable packet drops. If too many robots can only communicate via one or a few APs and considering the limited bandwidth provided by those APs it is possible that there will be congestion in the TSN network 40.

ACA can be a response to the network situation in both examples, through maintaining full functionality by increasing Application Cycle Time (ACT).

According to aspects of the present disclosure several measures are provided that can improve AFA by performing ACA and/or a number of further measures for a subset of TSN streams as a response to detecting network problems through endpoint communication analysis.

One of the main goals with industrial networks is to flatten the automation pyramid and allow IT/OT convergence towards the vision of "sharing the wire". Deterministic communication requires several detailed configuration parameters to be derived to achieve availability and determinism. According to one aspect of the present disclosure "OT endpoints" adapt their preferred application cycle in a shared network environment in order to receive acceptable upper bound on latencies/jitter and packet drop rates from the shared network.

In order to implement such an improvement, the congestion limiting function of the first endpoint device 42 monitors the quality of communication in the TSN network 40. It may more particularly monitor the quality of communication of the first TSN stream. It may do so through monitoring the receive buffer 68B on which it receives packets from the second end point device 44. It may more particularly detect a communication degradation in the first TSN stream through this monitoring or investigating of the receive buffer 68B, S100, which communication degradation is indicative of congestion in the data communication network. The communication degradation may be detected through identifying if there is jitter, latency and/or if packets are dropped, where jitter may be a first type of communication degradation, latency may be a second type of communication degradation and dropped packets may be a third type of communication degradation.

Jitter may be determined through investigating if the periodicity of the packets deviate from a nominal periodicity, latency may be determined based on a comparison of time stamps of received packets with the time of reception and dropped packets may be determined through the absence in the buffer of one or more packets in a sequence of packets. The absent packets should then be preceded by an earlier received packet in the sequence and succeeded by a later received packet in the sequence. It is possible that the packets of a sequence comprise a sequence number, which is incremented by one in each consecutive packet. The absence of packets may be detected through monitoring the above-mentioned sequence numbers possibly also together with time stamps.

The jitter may be compared with a jitter threshold, the latency with a latency threshold and the number of dropped packets with a dropped packet threshold. If now any of these thresholds is crossed, then the corresponding communication degradation type is detected and needs to be addressed.

The congestion limiting function of the first endpoint device 42 then investigates the types of communication degradation, S110, which investigation involves determining which type of communication degradation that has been detected.

The first endpoint device 42 has a group of congestion limiting activities that it may perform in order to limit the congestion caused by the communication degradation, where one of the activities is to adapt the application cycle time.

The group may be in the form of a list of different types of activities, which list may comprise:
1. applying application cycle adaptation,
2. adjusting or changing an offset of communication to a network cycle of the time sensitive network,
3. setting at least some packets intended to be transmitted over the communication path to be droppable, i.e. indicating to the network packets that can be dropped in case of congestion,
4. changing the priority of transmissions over the first communication path, for instance increasing the priority in case of too late arrival of frames,
5. choosing another path through the TSN network, and
6. throttling transmission from the transmit buffer 68A.

The application cycle adaptation may involve increasing the application cycle time. If for instance the TSN stream transmitted over the first path P1 was transmitted using the application cycle time 8 ms of the first application cycle AC1, the application cycle time may be increased, for instance to that of the second application cycle AC2, e.g. to a time of 64 ms, or even to the application cycle time of 256 ms of the third application cycle AC3. It may here be necessary to at the same time meet the previous-described timing requirements of the application.

The changing of offset may be carried out in the following way. In case the TSN network has a working clock, for instance as set out in IEEE 802.1AS-2020, the first end point device 42 may have an initial offset to this clock and this offset may be adjusted by the congestion limiting function of the first endpoint device 42. Thereby the timing of the transmission in a network cycle defined by the clock may be adjusted. This would avoid congestion in the TSN network with other traffic in the same network cycle, but with another offset. In case the TSN network uses a Time Division Multiplex (TDM) transmission frame structure, where the first end node transmits in a certain time slot, then the change of offset may involve a change of the transmission time slot.

An indicating of a packet that may be dropped may be implemented in the following way. The packets may each have a bit, a Drop Eligible Indicator (DEI) bit, that can be set. The congestion limiting function of the first endpoint device 42 may set this bit in some of the packets destined for the second endpoint device 44 and then the network can drop these packets in case communication degradation is experienced.

The increase of priority will in turn make sure that the packets of the TSN stream are being transmitted at the expense of lower priority communication.

The choosing of another path may involve the congestion limiting function of the first endpoint device 42 sending a request to a network managing entity for another communication path being set up through the TSN network to the second endpoint device 44.

Throttle transmission from the transmit buffer may be realized using a so-called Credit Based Shaper (CBS) being set not to exceed a certain Committed Information Rate (CIR). Thereby fewer "micro bursts" may be generated, which microbursts may stress the buffer consumption and increase Store & Forward times in the bridge nodes.

There is furthermore a mapping of the various activity types to the types of communication degradation that can be performed for the first TSN stream. There may thus exist a mapping between communication degradation type and congestion limiting activity. This mapping may originally be made by an engineer using an engineering tool via an engineering terminal. As can be seen later, the mapping may later be updated by the activity mapping device 60.

There may more particularly be a combination of activities mapped to each type of communication degradation in the first endpoint device 42, where each such activity combination may include at least one activity and at least one of the activity combinations may comprise ACA. The different activity combinations may additionally differ from each other. There may therefore be a first activity combination mapped to the first type of communication degradation, a second activity combination mapped to the second type of communication degradation and a third activity combination mapped to the third type of communication degradation.

The congestion limiting function of the first endpoint device 42 then performs a congestion limiting activity from the group of congestion limiting activities. In this case it more particularly performs at least one congestion limiting activity according to the mapping, S120. This may involve selecting and performing at least one congestion limiting activity according to the mapping. This means that for a certain type of communication degradation the congestion limiting function of the first endpoint device 42 performs a corresponding activity combination. For the case of the first type of communication degradation, here exemplified by jitter, it would thus perform the first activity combination, for the second type of communication degradation, here exemplified by latency, it would perform the second activity combination and for the third type of communication degradation, here exemplified by dropped packets, it would perform the third activity combination.

There may be more than one data stream in the first communication path having different priorities.

In this case the increasing of the application cycle time is first made for a low priority data stream. It is furthermore possible that the increasing of the application cycle time is made in an order of priority starting from the data stream with the lowest priority. It is additionally possible that the increasing of the application cycle according to the order of priority is stopped if the communication degradation ceases.

According to one example, the congestion limiting function of the first endpoint device 42 will then prioritize increasing ACT (see FIG. 8) for the low priority third TSN stream with AC3, before the medium priority second TSN stream with AC2 and as a last resort increase the application cycle AC1 of the high priority first TSN stream with AC1 in order to eliminate the cause of recurring loss of packets.

This was just one non-exclusive example of how the congestion limiting function might behave when very quickly taking mitigation action to keep up high AFA in the entire converged TSN network especially for low priority TSN streams, but also for medium and high priority TSN streams.

The first endpoint device 42 may also report the communication degradation to the activity mapping device 60 in the first communication degradation report CDR1, S130. The report may in this case also include information of the used activity combination. However, it is also possible that the activity mapping device already knows of the activity combination, in which case it can be omitted from the report. The report may also include data about the status of the receive buffer with regard to type of communication degradation before and after the performing of the congestion limiting activity.

It is in this way possible that the network congestion as experienced by the application is reduced. The congestion is thus handled on an application level. Thereby the availability of a specific application is also increased. This may be important because different applications may have different degrees of sensitivity to different types of communication degradation. Thereby, the specific situation of the application is considered in performing the congestion limiting activity. This may be beneficial in that other less sensitive traffic through the TSN network may remain uninfluenced.

Through the activities being performed in the endpoint device based on a mapping, the activity may at the same time be performed fast.

Here it is also worth mentioning that the first and second endpoint devices 42 and 44 may operate in identical ways, which means that they would experience the same types of communication degradation. The second endpoint device may thus have the same type of operation as the first endpoint device. The two endpoint devices would also perform the same combination of congestion limiting activities. This means that also the second endpoint device would have a congestion limiting function that detects a communication degradation of the first TSN stream and performs a congestion limiting activity from a group of congestion limiting activities, which congestion limiting activities are the same as in the first endpoint device. When there is a mapping, it may also be the same mapping in the second endpoint device as in the first endpoint device. The second endpoint device may thus also have a receive buffer that is investigated and a transmit buffer in relation to which at least some of the activities are performed.

ACA and "DEI tagged packet" dropping can often be acceptable mitigation activities to achieve acceptable OT behavior. They give resilience to the whole automation system (huge number of "OT endpoints" communicating over a shared and converged IT/OT network) that depends on reliable TSC. However, as can be seen above, also other activities may be used.

It is possible that the different combinations of activities being performed are not as effective as is desired and that they may need updating.

Figure 9:
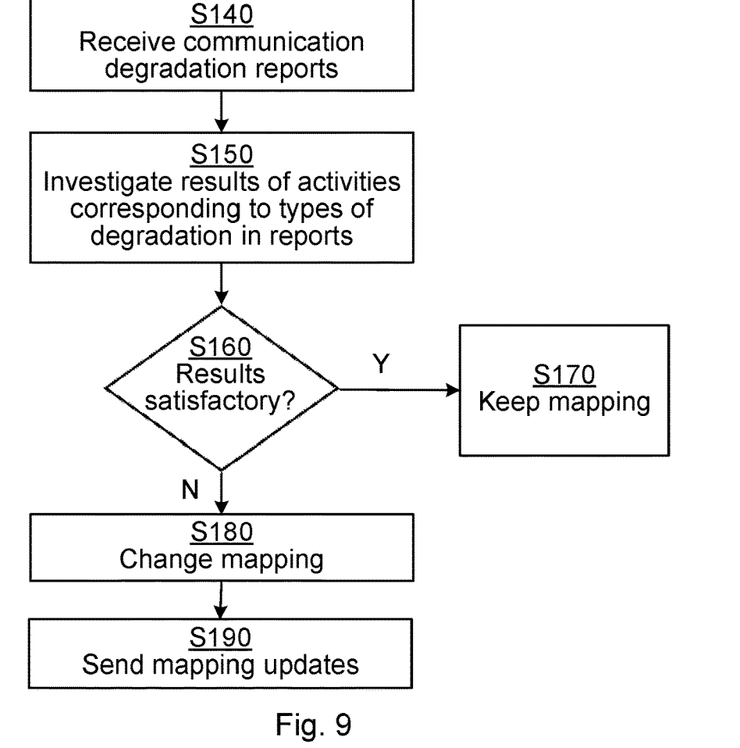

One way in which this may be done will now be described with reference being made to FIG. 9, which shows a number of method steps being performed by the activity mapping function of the activity mapping device 60 in order to change the way in which endpoint devices operate for improving communication. As the activity mapping device 60 is a central function, it may with advantage be provided together with the previously mentioned network managing entity.

As mentioned earlier, and as can be seen in FIG. 4, the first endpoint device 42 sends a first communication degradation report CDR1 to the activity mapping device 60 when it detects a communication degradation that needs to be handled for the application associated with the first TSN stream. As can also be seen in FIG. 4, the second endpoint device 44 sends a second communication degradation report CDR2, the third endpoint device 46 sends a third communication degradation report CDR3 and the fourth endpoint device 48 sends a fourth communication degradation report CDR4.

It can thereby be seen that the activity mapping device 60 receives communication degradation reports CDR1, CDR2, CDR3 and CDR4 about communication degradation from the different endpoint devices 42, 44, 46 and 48 of communication paths for data streams, S140, which reports include information about the different types of communication degradation being experienced by the endpoint devices and possibly also about the severity of these communication degradations. They may also include data about the status of the receive buffer with regard to type of communication degradation before and after the performing of the congestion limiting activity. As can also be seen the reports include a report CDR1 from the first endpoint device 42 and a report CDR2 from the second endpoint device 44. It is additionally possible that the activity combinations used to address the experienced types of communication degradation are included in the reports. As an alternative the activity mapping device 60 may already have this activity combination information.

The activity mapping function of the activity mapping device 60 may then investigate the results of activities corresponding to the types of communication degradation in the reports, S150. Thereby it investigates the results of currently mapped activities on reported communication degradations. The activity mapping function of the activity mapping device 60 may for instance perform this through investigating the status of buffers in the various TSN paths before and after the performing of the activity, such as what is the status of jitter, latency and dropped packets before and after the performing of the activities. The investigation may additionally be an investigation made for each data stream. The above-mentioned investigation may thus also be made for the data stream between the first and the second endpoint devices.

It then investigates if the result is satisfactory, S160, such as if there is an improvement in the status of the investigated buffers and possibly a degree of the improvement. In case the results of the actions are satisfactory, S160, then the mapping that was used is retained, S170.

However, in case the results are not satisfactory, S160, the activity mapping function of the activity mapping device 60 changes the mapping between the types of communication degradation and the congestion limiting activities, S180, which may involve exchanging one activity for another. The mapping change may additionally be performed for different TSN streams over different communication paths. It is thereby possible that the first and the second endpoint devices 42 and 44 receive a mapping update MU, while the third and fourth endpoint devices 46 and 48 do not, for instance because for these the result of the above-mentioned investigating may be satisfactory. Furthermore, as the third and the fourth endpoint devices 46 and 48 are associated with different TSN streams over other communication paths, if they do receive mapping updates, these mapping updates may additionally differ from the mapping update MU made for the first and second endpoint device 42 and 44.

In the example given here a mapping update is only made for the first and the second endpoint device 42 and 44. Therefore, after the mapping update MU has been made, it is then sent to the first and the second endpoint devices 42 and 44, S190. Thereby the first and also the second endpoint device 42 and 44 receive a changed mapping that is defined in the mapping update MU from the activity mapping device 60.

It can thereby be seen that mapping of the endpoint devices in the investigated communication paths of the TSN streams may be changed over time.

The combination of the congestion limiting function and the activity mapping function go directly towards endpoint devices and reconfigure their behavior. Also, the associated engineering tool may need to be informed of the mapping updates since initially, by engineering tools, configured "OT endpoint(s)" functionality and network forwarding may emanate from these Engineering Tools. Some mutual exclusion may additionally be required to either let CUC/CNC modify endpoint/network behavior or have the congestion limiting function and the activity mapping function do it.

In a variation of the present disclosure, traffic flows may be added in the TSN network. This may be done through employing Traffic Injectors for adding TSN streams. The traffic flows may be added in order to:

verify that these additional flows, together with all other Quality of Service (QoS) flows, can be served with the required latency/jitter/reliability forwarding, and sense where additional traffic causes congestion and/or unacceptable latencies/jitter/frame dropping through, in advance, creating suitable mitigation actions to be deployed by the congestion limiting function.

Traffic Injectors is like stimuli for the congestion limiting function and the activity mapping function. Traffic Injectors helps to improve the capability to mitigate network congestion or too slow forwarding before it happens.

It is possible to use Artificial Intelligence technology together with the traffic injectors. In this case the Traffic Injectors may train this Artificial Intelligence to continuously become more capable to mitigate OT network issues such as congestion. A traffic injector may with advantage be implemented as a part of the congestion limiting function.

Figure 10:
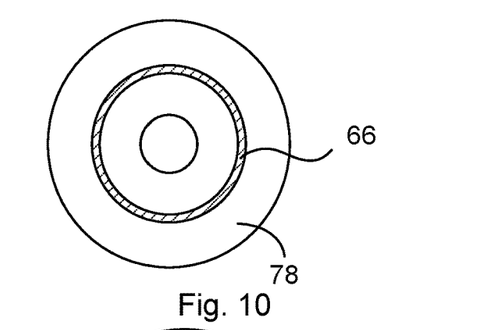

The congestion limiting function of the first endpoint device 42 may, as can be seen in FIG. 5, be provided in the form of a processor PR 62 together with a storage medium in the form of a computer program memory 64 including computer program code 66 for performing this function. This computer program code may also be provided on a storage medium or data carrier which performs the congestion limiting function when the program code is being loaded into a computer forming the first endpoint device 42. One such storage medium 78 with computer program code 66, in the form of a CD ROM disc, is schematically shown in FIG. 10. Such computer program may as an alternative be provided on a server and downloaded therefrom into the first end point device.

Figure 11:
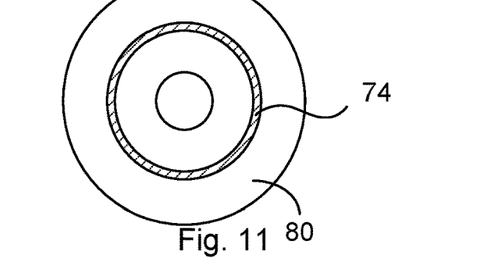

In a similar manner, the activity mapping function of the activity mapping device 60 may, as can be seen in FIG. 6, be provided in the form of a processor PR 72 together with a storage medium in the form of a computer program memory 72 including computer program code 74 for performing this function. This computer program code may also be provided on a storage medium or data carrier which performs the activity mapping function when the program code is being loaded into a computer forming the activity mapping device 60. One such storage medium 80 with computer program code 74, in the form of a CD ROM disc, is schematically shown in FIG. 11. Such computer program may as an alternative be provided on a server and downloaded therefrom into the activity mapping device.

The invention claimed is:

1. A method for improving communication between devices of an industrial automation system running automation applications, which devices comprise a first endpoint device and a second endpoint device of a communication path for a data stream through a time sensitive network and for which data stream a corresponding application has an application cycle time at which the first and second endpoint devices are to transmit data to each other, wherein the application cycle time is the time between consecutive transmitted packets of the data stream, the method comprising performing by the first endpoint device:

detecting a communication degradation of the data stream, which communication degradation is indicative of congestion in the data communication network, and performing a congestion limiting activity from a group of congestion limiting activities, which group at least includes an activity of increasing the application cycle time of the data stream and an activity of adjusting an offset to a network clock of the time sensitive network, wherein the first endpoint device comprises a receive buffer and the detecting of the communication degradation is performed through investigating the receive buffer.

2. The method according to claim 1, wherein the first endpoint device comprises a transmit buffer for transmission of data over the communication path and the group of activities includes an activity of changing the priority of transmissions over the communication path, an activity of setting at least some packets intended to be transmitted over the communication path to be droppable, an activity of setting up an alternative communication path through the time sensitive network and/or and activity of throttling transmissions from the transmit buffer.

3. The method according to claim 1, wherein the communication degradation is one of jitter, latency or dropped packets.

4. The method according to claim 1, wherein the communication degradation is of a certain type, wherein the first endpoint device has a mapping between communication degradation type and the congestion limiting activity, and wherein the congestion limiting activity is performed according to the mapping.

5. The method according to claim 4, further comprising reporting the communication degradation to an activity mapping device and possibly receiving a changed mapping from the activity mapping device.

6. The method according to claim 5, further comprising, in the activity mapping device, receiving communication degradation reports about communication degradation from the endpoint devices of communication paths for data streams, investigating, for the data stream between the first and the second endpoint devices, the result of at least one currently mapped activity on a reported communication degradation and changing the mapping for this data stream based on the investigation.

7. The method according to claim 4, wherein the mapping is a mapping of the communication degradation type to a combination of the congestion limiting activities, wherein each combination includes at least one of the congestion limiting activities, wherein at least one of the combinations includes the activity of increasing the application cycle time of the data stream.

8. The method according to claim 1, wherein the communication path includes a plurality of data streams having different priorities;
wherein the first endpoint device performs the activity of increasing the application cycle time in an order of priority starting with the data stream having the lowest priority.

9. The method according to claim 8, wherein the first endpoint device stops the activity of increasing the application cycle time according to the order of priority in response to the communication degradation ceasing.

10. The method according to claim 1, wherein the investigating the receive buffer includes investigating whether a periodicity of the packets in the receive buffer deviate from a nominal periodicity.

11. The method according to claim 1, wherein the investigating the receive buffer includes comparing time stamps of the packets received in the receive buffer with a time of reception.

12. The method according to claim 1, wherein the investigating the receive buffer includes investigating if one or more packets in a sequence of packets are absent in the receive buffer.

13. The method according to claim 1, wherein the detecting the communication degradation includes:
comparing the communication degradation with a threshold, and
determining that the communication degradation is detected in response to the threshold being crossed.

14. An arrangement for improving communication between devices of an industrial automation system running automation applications, which devices comprise a first endpoint device and a second endpoint device of a communication path for a data stream through a time sensitive network and for which data stream a corresponding application has an application cycle time at which the first and second endpoint devices are to transmit data to each other, wherein the application cycle time is the time between consecutive transmitted packets of the data stream, the arrangement including the first endpoint device having a processor acting on computer instructions, whereby said first end point device is operative to:
detect a communication degradation of the data stream, which communication degradation is indicative of congestion in the data communication network, and
perform a congestion limiting activity from a group of congestion limiting activities, which group at least includes an activity of increasing the application cycle time of the data stream and an activity of adjusting an offset to a network clock of the time sensitive network,
wherein the first endpoint device comprises a receive buffer and the detection of the communication degradation is performed through investigating the receive buffer.

15. The arrangement according to claim 14, wherein the communication degradation is of a certain type, wherein the first endpoint device has a mapping between communication degradation type and the congestion limiting activity, and wherein the congestion limiting activity is performed according to the mapping.

16. The arrangement according to claim 15, further comprising an activity mapping device having a processor acting on computer instructions, whereby said activity mapping device is operative to receive communication degradation reports about communication degradation from the endpoint devices of communication paths for data streams, said reports including a report from the first endpoint device, investigate, for the data stream between the first and the second endpoint device, the result of at least one currently mapped activity on a reported communication degradation and change the mapping for this data stream based on the investigation.

17. The arrangement according to claim 14, further comprising the second endpoint device having a processor acting on computer instructions, whereby said second endpoint device is operative to detect a communication degradation of a data stream and perform a congestion limiting activity from the same group of congestion limiting activities as the first endpoint device.

18. An industrial automation system comprising:
time sensitive network devices running automation applications, and
an arrangement improving communication between the time sensitive devices, which include a first endpoint device and a second endpoint device of a communication path for a data stream through a time sensitive network and for which data stream a corresponding application has an application cycle time at which the first and second endpoint devices are to transmit data to each other, wherein the application cycle time is the time between consecutive transmitted packets of the data stream, the arrangement including the first endpoint device having a processor acting on computer instructions, whereby said first end point device is operative to:
- detect a communication degradation of the data stream, which communication degradation is indicative of congestion in the data communication network, and
- perform a congestion limiting activity from a group of congestion limiting activities, which group at least includes an activity of increasing the application cycle time of the data stream and an activity of adjusting an offset to a network clock of the time sensitive network,
- wherein the first endpoint device comprises a receive buffer and the detection of the communication degradation is performed through investigating the receive buffer.

19. A computer program product for improving communication between devices of an industrial automation system running automation applications, which devices comprise a first endpoint device and a second endpoint device of a communication path for a data stream through a time sensitive network and for which data stream a corresponding application has an application cycle time at which the first and second endpoint devices are to transmit data to each other, wherein the application cycle time is the time between consecutive transmitted packets of the data stream, said computer program product comprising a non-transitory computer readable storage medium with computer program code which when run by a processor of the first endpoint device causes the first endpoint device to:
- detect a communication degradation of the data stream, which communication degradation is indicative of congestion in the data communication network, and
- perform a congestion limiting activity from a group of congestion limiting activities, which group at least includes an activity of increasing the application cycle time of the data stream and an activity of adjusting an offset to a network clock of the time sensitive network,
- wherein the first endpoint device comprises a receive buffer and the detection of the communication degradation is performed through investigating the receive buffer.

* * * * *